Patented July 16, 1946

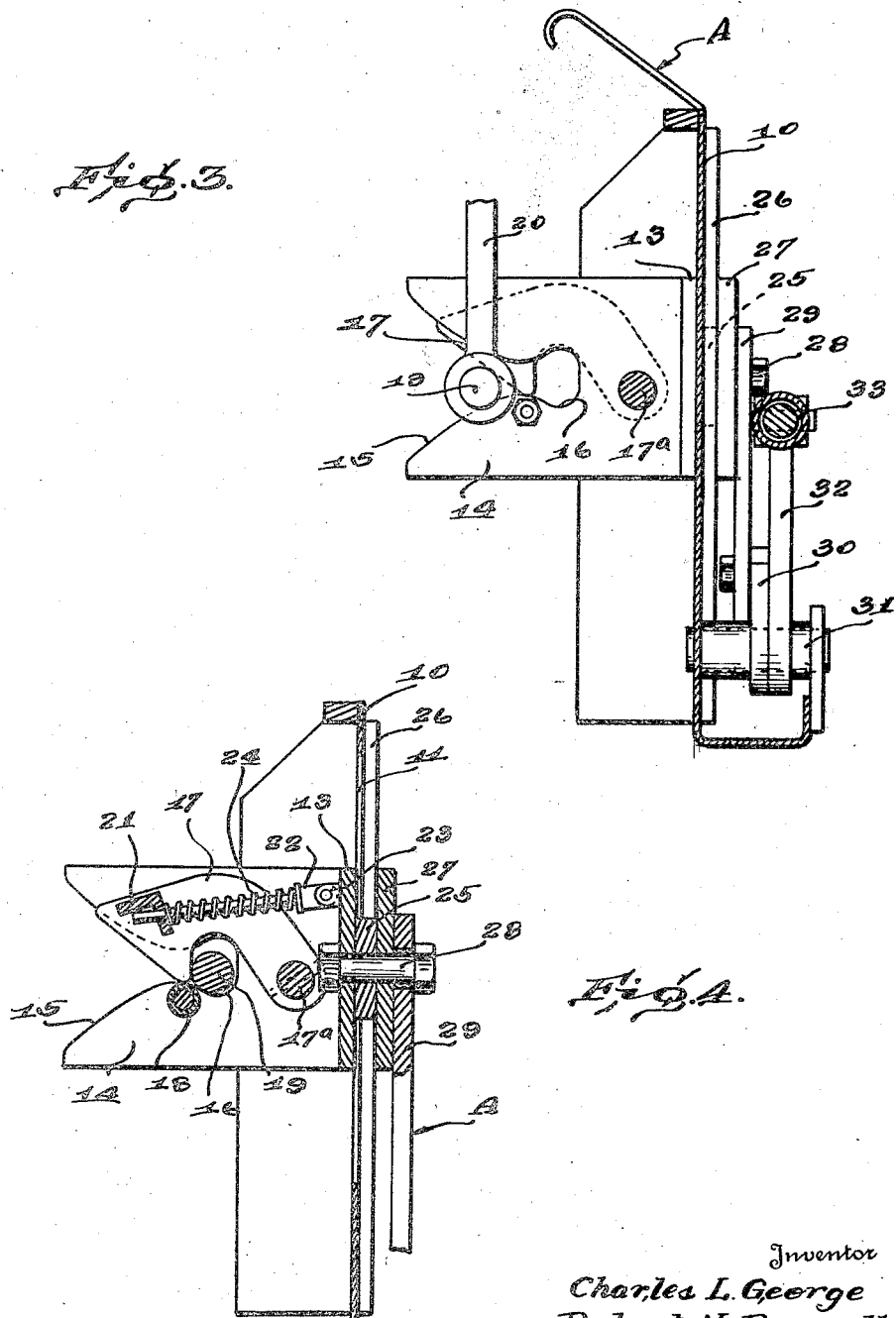

2,403,973

UNITED STATES PATENT OFFICE 2,403,973

MATERIAL SPREADER HITCH

Charles L. George and Robert N. Bennett, Findlay, Ohio, assignors to The Buckeye Traction Ditcher Company, Findlay, Ohio, a corporation of Ohio Application February 26, 1944, Serial No. 523,972

1 Claim. (Cl. 280—33.15)

This invention relates to hitch or coupling devices particularly for use in detachably coupling a towed vehicle such, for example, as a material spreader, to a towing vehicle such, for example, as an automobile truck or the like.

An object is to produce a hitch of the above character which is relatively simple and inexpensive to manufacture and assemble, easy to operate, and is thoroughly reliable particularly where the towing vehicle is, from time to time, out of alignment with the towed vehicle.

Another object is to produce a hitch of this character which is adjustable to accommodate the different truck mountings and which is so constructed and arranged that the towed and towing vehicles can assume different angular positions relative to each other without unduly straining the hitch or rendering it unsatisfactory.

Other objects and advantages of the invention will hereinafter appear and for purposes of illustration but not of limitation, an embodiment of the invention is shown in the accompanying drawings in which Figure 1 is a fragmentary front end elevation of a material spreader with the hitch or coupling device carried by the towed vehicle mounted in place thereon;

Figure 3 is an enlarged vertical sectional elevation of the hitch on the material spreader showing the coupling bar on the towing vehicle prior to being coupled to the material spreader hitch; and Figure 4 is a vertical sectional view of the material spreader hitch taken vertically through the center of the hitch showing the truck mounted bar in position.

Figure 1:
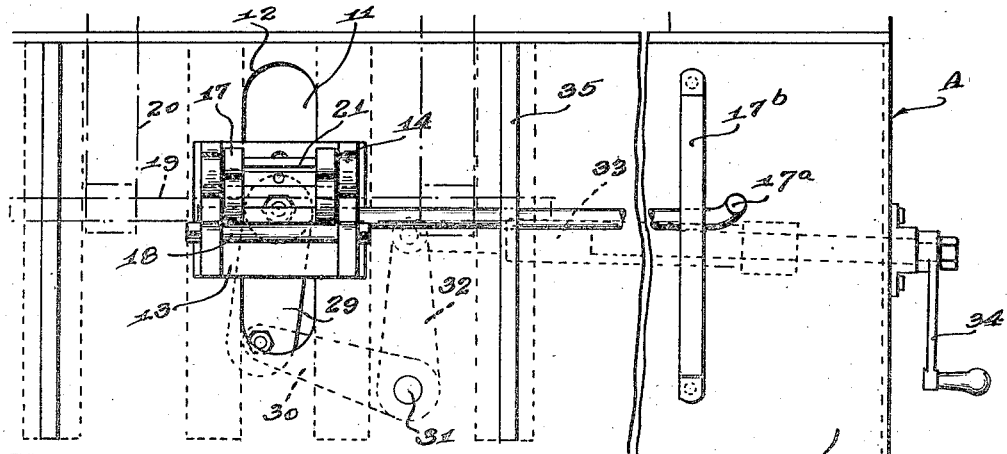

The illustrated embodiment of the invention comprises a material spreader generally designated at A. Since the structure of the material spreader forms no part of the present invention, detail illustration thereof is not considered necessary. Suffice it to say that the material spreader may be of the character used for spreading crushed stone over a highway, and in general comprises a hopper-like structure into which the crushed stone is delivered and from the bottom of which the stone is uniformly spread along the highway as the spreader moves. The spreaders are mounted on wheels. Ordinarily two sets of wheels on a common axis are arranged, one set on each end of the spreader box or hopper. The spreader is towed usually by a truck to which it is detachably coupled or hitched, this invention being concerned primarily with the hitch or coupling device for connecting the material spreader to the truck or other towing vehicle.

As shown, the material spreader A has a front vertically disposed wall 10 which is of sheet metal. Arranged centrally in the front wall 10 between the opposite ends is a vertically disposed slot 11, the top and bottom ends of which are rounded as indicated at 12. Mounted for vertical adjustment in the path defined by the vertically elongate slot 11 is a latch assembly which comprises a rear horizontally disposed plate 13, the ends of which extend on opposite sides of the slot 11. The plate is disposed in abutment with the front face of the spreader wall 10 and securely fixed as by welding to the opposite ends of the rear plate 13 are fork members 14. The fork members 14 extend at substantially right angles forwardly of the rear plate 14 and the front end of each fork member has an outwardly flaring mouth 15 which terminates in a rod-receiving notch 16 which, as particularly shown in Figures 3 and 4, is vertically elongate. It should be noted that the flared mouth 15 of each fork member has an upper and lower curvilinear contact surface to facilitate the engagement of the truck mounted rod as will hereinafter appear.

On the inner side of each fork member 14, and in close juxtaposition thereto, is a hook-shaped latch 17, the inner end of which is pinned to a horizontally disposed latch control rod 17a so that rotation of the rod 17a in a clockwise direction (Figures 3 and 4) retracts the latch to enable the truck mounted coupling bar to engage in the notches 16 or to be released therefrom, as will be readily apparent. The latch control rod 17a extends horizontally to near one end of the material spreader A and has an out-turned end portion to form an operating crank handle for facilitating actuation of the latches adjacent one end of the material spreader. Attached to the front wall 10 of the material spreader is a guide 17b which forms with the front wall 10, a vertical guide for the control rod 17a.

In the latched position of the latches 17, the hook end engages a stop 18 which is in the form of a sleeve mounted on a bolt which is secured to both fork members 14. Spring means is provided for normally urging the hook-shaped latches 17 into engagement with the stop 18. For this purpose, an angle bar 21 is fixed at its opposite ends respectively to the inner sides of the latches 17. One flange of the angle bar is apertured for slidingly receiving a spring mounting arm 22. The inner end of the arm 22 is pivoted at 23 to a bracket fixed to the rear latch plate 13. On the arm 22 is a coil spring 24. It will thus be manifest that rocking of the latches 17 in a clockwise direction (Figure 4) compresses the coil spring 24 which serves to urge the latches 17 against the stop 18.

Figure 2:
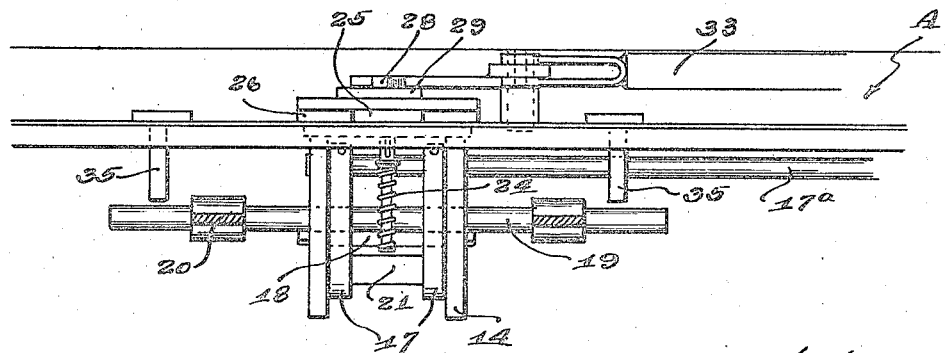
Figure 2 is a top plan view partly in section showing the hitch structure on the material spreader connected to the hitch bar carried by the towing vehicle such as an automobile truck.

Suitably fixed to the rear end of the towing vehicle such as an automobile truck, are a pair of laterally spaced depending bracket arms 20 and secured to the lower ends of the arms 20 is a horizontally disposed rod 19 which, as indicated in Figures 1 and 2, extends laterally a substantial distance beyond the fork members 14, the vertically disposed bracket arms being spaced also laterally from the fork members 14. In practice, the truck or towing vehicle is backed into the material spreader and the rod 19 engages in the notch 17 when in latched position.

Arranged directly in rear of the rear plate 13 of the latch is an annular disc 25 which is disposed within the vertically elongate slot 11 of the material spreader wall 10. The disc 25 fits within the slot 11 in such manner that it can move vertically therein and the curvature 12 generally corresponds to the curvature of the disc.

Formed on the rear face of the material spreader wall 10 is a pair of vertically disposed guide plates 26 which are spaced from each other a distance slightly greater than the diameter of the disc 25. By inspection of the drawings, it will be observed that the disc 25 not only is slidably mounted within the vertical slot 11, but also moves between the vertical plates 26 which assist in guiding the movement of the latch assembly. In abutment with the rear face of the disc 25 is a back plate 27 which is horizontally disposed with its ends terminating substantially flush with the outer edges of the guide plates 26. The rear plate 13 of the latch assembly, the annular disc 25, and the back plate 27 are secured together by a bolt and nut assembly 28. The bolt and nut assembly 28 also secures an actuating link 29 arranged directly in rear of the back plate 27.

The actuating link 29 extends downwardly and is pivoted at its lower end to an arm 30 of a bell crank. The bell crank is mounted upon a pivot 31 which is carried by the lower portion of the material spreader wall 10, it being understood that these parts are arranged rearwardly of the material spreader wall 10. The other arm 32 of the bell crank is vertically disposed and is pivoted at its upper end to a horizontally disposed telescoping screw-threaded operating rod assembly 33. This assembly extends laterally to one end of the material spreader and is equipped with a crank handle 34. Manifestly by turning the crank handle 34 in one direction or the other, the latch assembly carried by the material spreader is either moved upwardly or downwardly according to the direction of rotation for positioning the fork members and associated parts in the desired position convenient for engagement with the horizontal bar 19 carried by the towing vehicle. When the assembly is adjusted to the desired position and the towing vehicle backed into desired position, it will be understood that the latch control rod 17a is actuated to rock the latches 17 upwardly to permit the rod 19 to be moved into position, whereupon the rod 17a is released and the coil spring 24 rocks the latches to latching position, such as illustrated on Figure 4.

As above mentioned, the truck mounted rod 19 projects a substantial distance laterally of each of the fork members 14. In fact, the rod 19 projects laterally of the vertically disposed bracket arms 20 and adjacent each of these laterally projecting portions is a brace or bumper bar 35 which is fixed to the front face of the material spreader wall 10 and projects forwardly therefrom. The brace or bumper bars 35 which may extend substantially the full depth of the material spreader wall 10 are engageable by the bar 19 in the event that the truck or towing vehicle is angularly disposed relative to or out of alignment with the material spreader A. Thus in the event that the towing vehicle or truck turns in one direction or the other, one end or the other of the rod 19 will engage the adjacent brace bar or bumper, thereby to assist in causing the material spreader A to be brought again into alignment with the towing vehicle. It will be understood that the notch 16 in the fork members 14 is so shaped as to allow a certain amount of angular movement of the rod 19 both in a horizontal direction as well as in a vertical direction, thus to afford a limited amount of lost motion during the turning of the towing vehicle in one direction or the other, or in the event that the towing vehicle encounters a depression or raised position on the road surface.

It will be understood that numerous changes in details of construction, arrangement and operation may be effected without departing from the spirit of the invention especially as defined in the appended claim.

What we claim is:

A hitch for material spreaders comprising in combination with a spreader body having a vertically elongate slot curved at the top and bottom ends, an annular disc fitting said slot and slidable vertically therein, a back plate abutting said disc and disclosed on the inside of said body, a latch housing on the outside of said body and arranged adjacent said disc, a bolt and nut assembly common to said latch housing, disc and back plate for holding such assembly rigidly together, vertical guide plates fixed to the inside of said body on opposite sides of and in guiding relation to said disc, said back plate extending laterally beyond opposite sides of said disc in abutting relation to said guide plates respectively, link and lever means for vertically adjusting said latch housing, disc and back plate assembly, a movable latch in said latch housing, manual means for actuating said latch, a horizontally disposed bar fixed to the towing vehicle, and engageable in said latch housing, said bar projecting a substantial distance on opposite sides of said latch housing, and brace bars on the outside of the spreader body wall in position to be engaged by the projecting end portions of said bar respectively when the spreader is out of alignment with respect to the towing vehicle.

CHARLES L. GEORGE.
ROBERT N. BENNETT.